United States Patent [19]

Kaprelian

[11] Patent Number: 4,728,770
[45] Date of Patent: Mar. 1, 1988

[54] DUAL AXIS OPTICAL SYSTEM

[75] Inventor: Edward K. Kaprelian, Mendham, N.J.

[73] Assignee: Questar Corporation, New Hope, Pa.

[21] Appl. No.: 43,180

[22] Filed: Apr. 27, 1987

[51] Int. Cl.$^4$ ............................................. B23K 26/02
[52] U.S. Cl. ...................... 219/121 LZ; 219/121 LU; 219/121 LS
[58] Field of Search .................. 219/121 LZ, 121 LY, 219/121 LU, 121 M, 121 L, 121 LC, 121 LD, 121 LV, 121 LQ, 121 LR, 121 LS; 356/399, 400

[56] References Cited

U.S. PATENT DOCUMENTS

| | | | |
|---|---|---|---|
| 3,382,343 | 5/1968 | Muncheryan | 219/121 LZ X |
| 3,383,491 | 5/1968 | Muncheryan | 219/121 LZ X |
| 4,474,469 | 10/1984 | Abe | 356/399 |
| 4,532,402 | 7/1985 | Overbeck | 219/121 |
| 4,584,455 | 4/1986 | Tomizawa | 219/121 |

*Primary Examiner*—C. L. Albritton
*Attorney, Agent, or Firm*—Dann, Dorfman, Herrell and Skillman

[57] ABSTRACT

An apparatus for applying a laser beam to an area on a work surface includes means for viewing said area with visible light prior and subsequent to application of the laser beam. The laser beam system includes a stationary portion comprising a laser, condenser and pinhole and a movable portion comprising a large aperture objective. The visible light system comprises a fixed video camera and lens and a movable portion including an objective and a light source. The movable portions of the laser beam system and the visible light system are mounted on a common slidable carriage.

17 Claims, 3 Drawing Figures

DUAL AXIS OPTICAL SYSTEM

BACKGROUND OF THE INVENTION

Although one class of lasers is frequently the basis for communications, ranging, and various types of instrumentation, a second class of lasers is widely used to deliver high levels of energy per unit area to materials of various types for a variety of applications including drilling, cutting, welding, scribing, marking, processing and medical treatment. The wavelengths of the laser sources so used commonly range from 193 nanometers in the vacuum ultraviolet to 10.6 microns in the infrared.

High energy lasers of this class are used in conjunction with optical systems which accept the laser beam and modify it to perform a specific function; such systems concentrate the laser energy into a small spot focused on the workpiece, or object, to be treated. The spot size, depending upon the specific laser action desired may vary from a few microns to a millimeter in diameter or larger.

Among the objects to be treated with lasers delivering high energy levels per unit area include biological tissues (for treatment or micro surgery), gemstones (for cutting or for identification marking) and microcircuit boards (for exposing circuit components under a polymer or other overcoat).

The lasers used for the treatment of microcircuit wafers are preferably those of the pulsed type and having very short wavelengths such as are provided by argon fluoride lasers operating in the ultraviolet region at 193 nanometers. The optical system for delivering the 193 nm energy requires the use of quartz lenses for efficient refraction, and multi-layer mirrors designed for efficient reflection of this energy.

In those applications where the laser spot size is large as in the case of welding using 10.6 micron carbon dioxide lasers the effect of the laser action on the workpiece is readily apparent under low magnification and even to the unaided eye. When the spot diameter is in the range of a few microns to a millimeter, however, the fine details in the altered workpiece after it has been imprinted with the laser spot can be distinguished only under high magnification and high resolution. Because it is frequently necessary to provide access to the workpiece surface for purposes of manipulation following modification with laser energy, a relatively large clearance is desirable between the viewing optics and the work surface. The magnification required for viewing is ordinarily about 1000×, with viewing commonly done on a video screen. The physical clearance obtained with a moderate power, fairly high numerical aperture, long working-distance microscope objective which would be used for forming an image of the imprint made on the workpiece, is about 8 to 10 mm.

In an ideal system the active area on the workpiece would be continuously viewable during laser action, and this is achievable in an arrangement using a beamsplitter, provided (a) the wavelength of the laser radiation falls within or close to the visible spectrum, out to about 0.8 micron in the near infra red and 0.35 microns in the near ultraviolet, or (b) the viewing is also with visible laser light, thereby reducing some of the problems of achromatism. With condition (a) it may be possible to design an objective lens which would be sufficiently well corrected to act both as the lens for focusing laser energy on the workpiece and as the lens for imaging the active area photographically or onto a video camera. With condition (b) the optical design area of interest on the target could not be seen in true color, and there would remain the problem of laser speckle.

With the white light system of (a) it is not possible to design such a system if the laser wavelength falls far outside the visible spectrum. If the laser source is in the fairly far ultraviolet spectrum (193 nanometers or 0.193 microns) or the fairly far infra red spectrum (10.6 microns) the required optical corrections for sharp imagery in both the visible spectrum (0.4 to 0.7 microns) and the laser spectrum is not achievable in a lens or mirror objective having a large relative aperture and long working distance. In addition, a beam splitter which would transmit the laser light and reflect the visible light, or vice versa, would be costly and not necessarily efficient.

Related devices appear in the prior art. U.S. Pat. No. 4,584,455 describes a laser beam machining apparatus for trimming thick film resistors and the like which employs a first working laser for removing material from the workpiece and a second visible light laser for viewing the workpiece, the two lasers having a coincidence via beam splitting mirrors. A scanning system having a stated resolving power of ten microns positions the laser spots on a selected area of the workpiece. The area on the workpiece illuminated by the visible laser is received on a CCD pickup camera, the output of which, through coordinate and compensation circuits, corrects for temperature drift. Although values of focal length or relative aperture of the scanning lens or CCD camera lens, or of distances between the various optical components are not given in the specification, an examination of FIG. 5 indicates that the scanning lens might have an aperture of f/8. The lens on the CCD camera, even if an extreme telephoto having an effective focal length twice the physical length shown in FIG. 5, would produce on the CCD an image of the visible laser spot on the workpiece at a magnification of about 0.3. Thus a 10 micron spot on the workpiece would be imaged as a 3 micron spot on the CCD. If the CCD camera has 512×512 elements along a 10 mm side it can resolve 50 lines/mm or a 20 micron diameter spot; with the conjugates shown in FIG. 5, the smallest image element it can resolve at the workpiece is 20×3.3 or 66 microns. If the lens on the CCD camera has a focal length corresponding to an ordinary lens having the relative size shown in FIG. 5, the finest detail visible in the workpiece will be 100 microns in size or greater.

U.S. Pat. No. 4,532,402 shows an apparatus for repairing integrated circuits by positioning a laser beam on a semiconductor surface through use of galvanometer driven mirrors. The integrated circuit board or workpiece is held on x and y axis platforms which position the workpiece under an optical system which includes a microscope objective and the galvanometer driven mirrors. Positioning of the platforms is achieved through interferometry and a control processor. There is no provision for an optical system for viewing the workpiece.

SUMMARY OF THE INVENTION

It is an object of the invention to locate a specific point on a workpiece and to apply laser energy to said point.

It is a further object of the invention to view such a specific point on a workpiece following the application of laser energy in order to evaluate the action of such application.

It is a still further object of the invention to view the specific point in natural color.

It is a still further object of the invention to provide means for accurately locating a specific point in the workpiece and to allow searching for and accurately locating other specific points.

In accordance with these and other objects of the invention there is disclosed a device for altering the surface of a target or workpiece using laser energy. The workpiece is held, preferably, on a table which can be moved precisely along x-axis and y-axis directions to allow location of points of interest on the workpiece. A mechanism above the workpiece carries two optical systems, one for viewing a point of interest on the workpiece in visible light and one for applying laser energy to the point of interest. The objectives of the two optical systems are spaced apart on a carriage mechanism which accurately positions either optical system over the point on the workpiece. In one position of the carriage the viewing system observes the surface while in a second position the laser system applies structure-altering energy to the surface.

In the embodiment shown in the figures the invention is applied to the correction of large scale integrated circuits. The action of the laser ablates away a transparent covering layer to expose circuit elements beneath which are then altered.

Other applications such as for biological or medical purposes use the same elements and structure with little or no modification.

BRIEF DESCRIPTION OF THE DRAWINGS

A preferred form of the invention is shown in the accompanying drawing in which.

BRIEF DESCRIPTION OF THE PREFERRED EMBODIMENT

Figure 1:
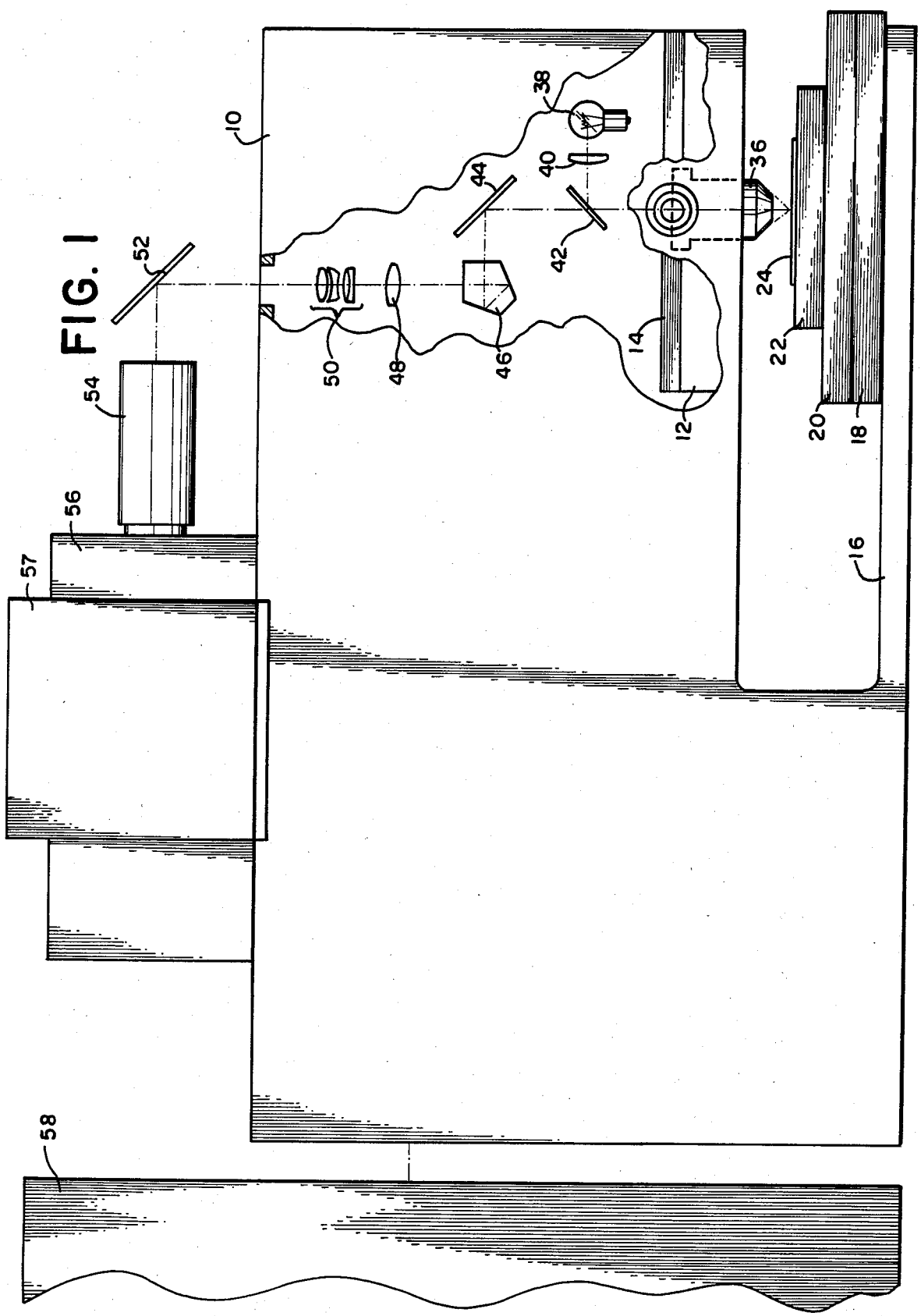
FIG. 1 is a left side elevational view of the system with part of the side broken away to show schematically the optical arrangement for viewing.
Figure 2:
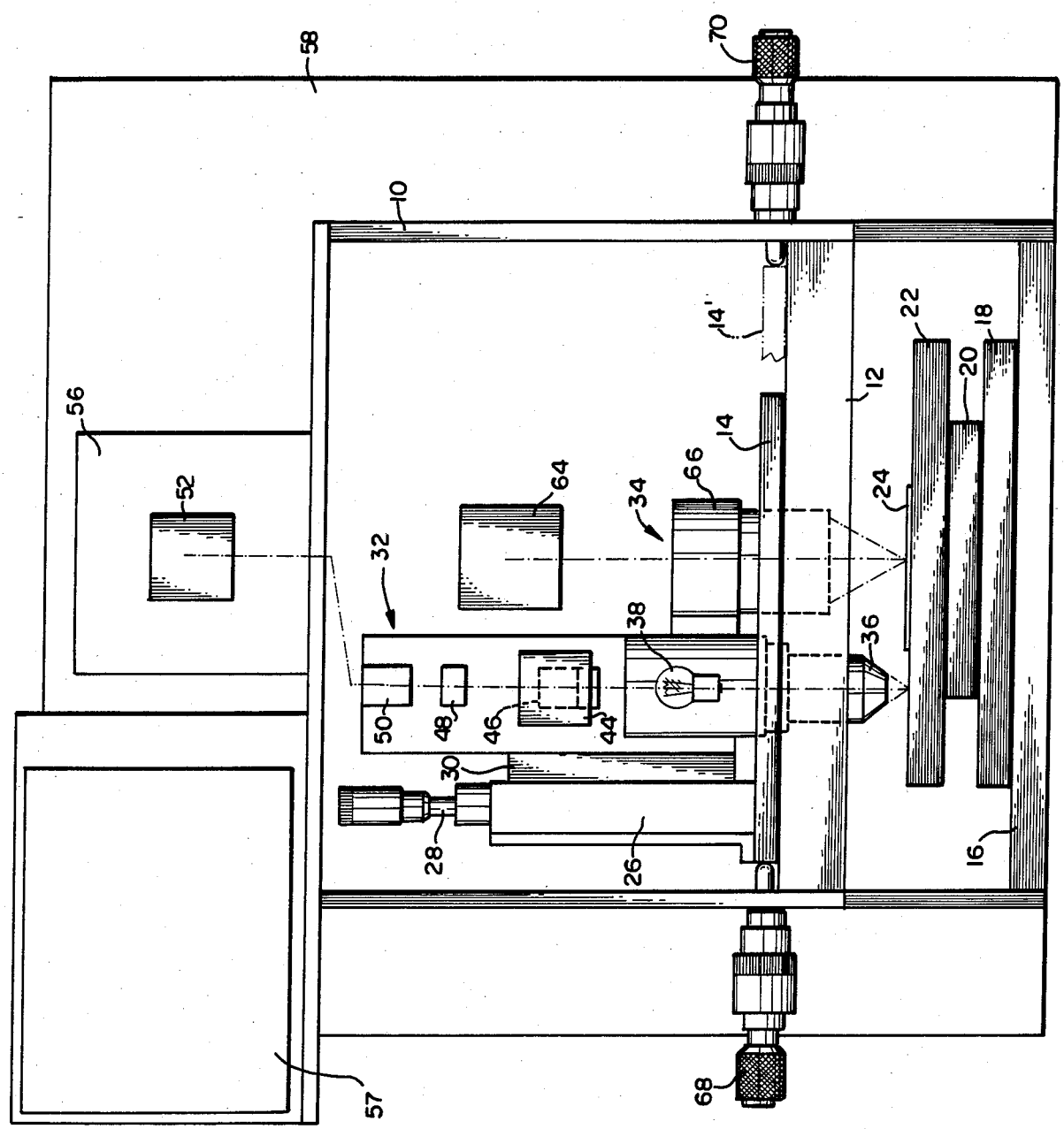
FIG. 2 is a front elevational view showing the optical arrangement in its energy-applying (laser-active) position.

Referring first to FIGS. 1 and 2, there is shown the principal elements of a device intended for the manipulation of microcircuit wafers.

The primary optics of the device are contained within a rigid housing 10 which carries within it base 12 and carriage 14 of a linear translation stage the base of which is fixed to the two side walls of the housing. The housing is provided with a floor 16 upon which rests the base of a target positioning means, here provided by a dual axis translation stage 18, said stage supporting an x-axis carriage 20 and a y-axis carriage 22. Resting on the y carriage is a target, an object to be modified by a laser beam, for example, an integrated circuit wafer 24. Carried atop the carriage 14 is a vertical translation stage 26 provided with a micrometer screw 28 for raising and lowering the stage. A plate 30 attached to stage 26 and moved vertically by it is a portion of each of two optical systems: a visible light viewing system and a laser system shown generally at 32 and 34 respectively.

The viewing system which is best seen in FIGS. 1 and 2 comprises a microscope objective 36 of high power, large numerical aperture, high resolving power and having a long working distance such as the Nikon R ELDW 20× having a magnification of 20 power, a 10 mm working distance and a numerical aperture of 0.40. An area on the target which is to be viewed is illuminated by a lamp 38, condenser 40 and beam splitter 42 and through objective 36. Light reflected back from the target passes through the objective and the beam splitter and is reflected by mirror 44 into pentaprism 46 which redirects the light upward into field lens 48 within which is formed a primary image of the target area at a linear magnification of, preferably, between 10 and 30 times. This image is collimated by lens 50 and the light is reflected by mirror 52 into lens 54 of video camera 56 which produces an image on video screen 57. Although a video camera is shown it is obvious that a photographic camera could be used in situations when an image on film is desired.

It should be noted that because the light leaving lens 50 is collimated, vertical movement of the visible optical system comprising elements 36 to 50 inclusive, necessary for focusing the objective 36 sharply on the target, will not require refocusing of lenses 50 or 54. It should be further noted that the optical arrangement comprising elements 36 to 54, inclusive, together with camera 56 assures that the image viewed on video receiver 57 is vertical and correct left-to-right.

Figure 3:
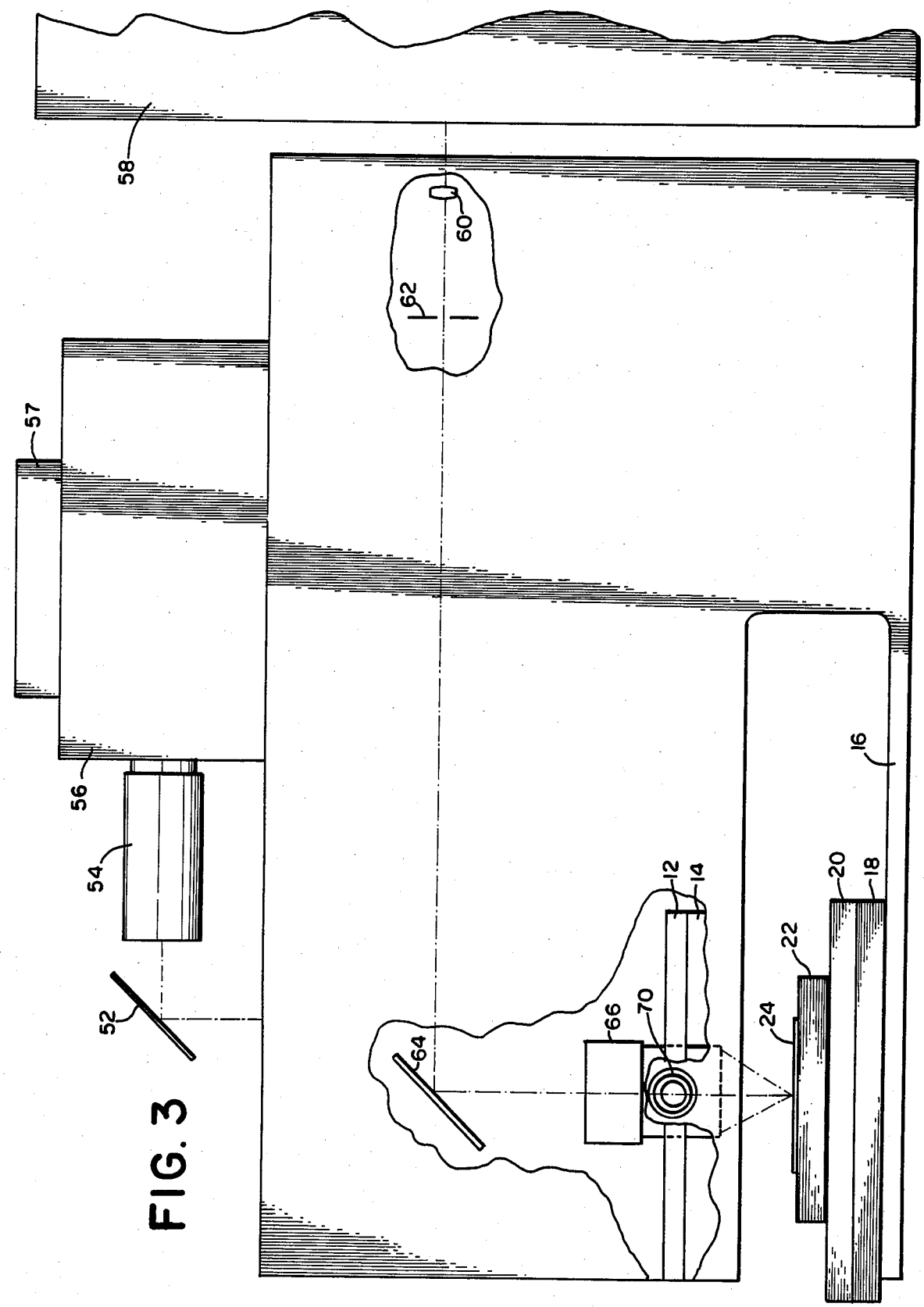
FIG. 3 is a right side elevational view with part of the side broken away to show schematically the laser arrangement.

The laser or energy system, best shown in FIGS. 2 and 3, includes a laser 58, which for some applications, as for manipulation of microcircuit wafers, is a 193 nanometer excimer laser such as the Questek R 2000. Output from the laser is focused by condenser 60 through pinhole 62 and to mirror 64, these three components being rigidly attached to housing 10. The u.v. beam directed downwardly by mirror 64 is received by u.v. objective 66 which focuses the beam onto workpiece 24. To produce a 10 micron spot on the workpiece, for example, the pinhole diameter can be 80 microns when using a u.v. objective of 40 mm focal length and a spacing between the pinhole and the objective of about 360 mm. The relative aperture of the objective is preferably about f/1. The u.v. objective is mounted on plate 30 and moves simultaneously with microscope objective 36 and its associated optical elements.

FIG. 2 shows the carriage 14 and optical systems 32 and 34 in their leftmost position with the u.v. objective located above the spot previously selected for receiving pulsed u.v. energy. This position is initially established by a differential micrometer 68 such as the Newport Corporation model DM-13. To initially view the selected spot through the visual system, carriage 14 is moved by manual or powered means to the right side so that carriage 14 assumes the position 14' abutting against a second differential micrometer 70. The distance traveled by carriage 14 in moving from its leftmost position to its rightmost position is the distance between the vertical axes of the movable portions of the viewing system and of the u.v. objective. The accuracy of the micrometers is such that the two axes can be positioned over the targeted spot within one micron.

In use the wafer 24 or other object to be examined and treated is positioned on carriage 22 and brought into the field of view of the viewing system when the latter is in its rightmost position so that the objective 36 of the viewing system is focused on an area close to the area of interest on the target. The x-y translator on which the target is held is then manipulated to find the center of the area to be examined and/or treated with the energy beam. When such an area is found the carriage is moved to the other side either manually or electrically at which point the focus of the ultra violet objective falls precisely on the same center. The laser is activated for a given number of pulses, the carriage returned to its initial viewing position and the image of the center of interest examined on the video screen to determine if additional application of radiant energy is required. This selected portion of the target may be manipulated with tools or other devices carried on a micro manipulator, not shown, and the process repeated for other areas of interest.

Positioning of the target and the optical system relative to each other can take either of two modes. In the first mode, shown and described above, the main body of the optical system remains fixed and the target is moved on an x-y translator to position a selected portion of the target under the viewing section of the optical system. This is preferable when the target is relatively small in size and mass and is conveniently supported by readily available translators well known in the art such as those made by Newport Corporation or Oriel Corporation.

In the second mode the target is held stationary in a position close to the axis of the optical system while the entire main body of the optical system is moved on an x-y translator until the viewing section of the optical system is aligned with that portion of the target which is of interest. This is the preferred mode where the target body is physically large or is difficult to immobilize as in the case of medical subjects.

I claim:

1. An optical device comprising:
   a first optical system having a first light source operating at a first wavelength band and a second optical system having a second light source operating at a second wavelength, each of said optical systems having a stationary portion and a movable portion;
   movable means supporting the movable portions in fixed relationship to one another, with parallel spaced-apart optical axes for the first and second optical systems and so that the movable portions are movable as a unit relative to the stationary portion; and
   means on the stationary portion to index the movable portion in each of two positions such that in one position the axis for the first system assumes the position relative to the stationary system that the axis for the second system occupies in the other position whereby the same point illuminated by the first light source in the one position may be illuminated by the second light source in the other position, and vice versa.

2. An optical device as claimed in claim 1, said movable portion of said optical systems being mounted on a common support movable transverse to the optical axes.

3. An optical device as claimed in claim 1, said light source for said second optical system comprising a laser.

4. An optical device as claimed in claim 1, said second optical system comprising a laser, the position of which is fixed relative to the stationary portion of said second optical system.

5. An optical device comprising:
   a first optical system having a visible light source and a second optical system having a laser source, each of said optical systems having a stationary portion and a movable portion;
   movable means supporting the movable portions in fixed relationship to one another, with parallel spaced-apart optical axes for the first and second optical systems, said movable portions of said optical systems on said support being movable as a unit relative to the stationary portion from a first position to a second position; and
   means on the stationary portion to index the movable portion in each of said first and second positions such that in the first position the axis of the first system assumes the position relative to the stationary system that the axis of the second system occupies in the second position, whereby the same point illuminated by the first light source in the first position may be illuminated by the laser in the second position, and vice versa.

6. An optical device as claimed in claim 5, said movable portion on said support being movable a distance equal to the separation of their axes in moving from said position to said second position.

7. An optical device as claimed in claim 5, said first optical system including an imaging means for viewing a magnified image of an object illuminated by said light source when said support is in said first position.

8. An optical device as claimed in claim 5, the position of said laser of the second optical system being fixed relative to the movable portion of said second optical system and means for directing the output of said laser into the movable portion of said second optical system when said optical system is moved from the first position to the second position.

9. An optical device comprising:
   a first optical system having a first light source operating at a first wavelength band and a second optical system having a laser source operating at a second wavelength, each of said optical systems having a stationary portion and a movable portion;
   movable means supporting said movable portions in fixed relationship to one another, with parallel spaced-apart optical axes for the first and second optical systems and so that the movable portions are movable as a unit relative to the stationary portion in a plane generally normal to said optical axes;
   means on the stationary portion to index the movable portion in each of two positions such that in one position the axis for the first system assumes the position relative to the stationary system that the axis for the second system occupies in the other position whereby the same point illuminated by the first light source in the one position may be illuminated by the laser source in the other position, and vice versa; and
   target positioning means for positioning an object to be acted upon by the laser relative to the axis position assumed in turn by each optical system in a plane generally normal to said axis.

10. The optical device as claimed in claim 9 in which the laser is of a type and energy level to modify a target material on the target positioning means.

11. The optical device as claimed in claim 10 in which the laser operates in the ultraviolet region and is provided with a pin hole aperture directing a laser beam along an optical path to the target material in one position.

12. The optical device as claimed in claim 9 in which the first optical system provides a source of visible light and is provided with means directing the light along one of the parallel axes toward a target material in one position and light reflected from the target material along said axis is magnified and directed toward a camera.

13. The optical device as claimed in claim 9 in which the target positioning means is supported on the stationary portion relative to which it is movable in a plane generally normal to said axis.

14. The optical device as claimed in claim 9 in which said movable means is provided with adjustment means to move the movable means and the supported movable portions of the optical means in a direction generally parallel to said optical axes.

15. The method of processing a work piece comprising:

providing optical viewing means and laser means having parallel optical axes on a common platform movable relative to a support for the work piece along a predetermined path between first and second positions, wherein the laser means in the second position assumes the position of the optical viewing means in the first position;

with the platform in the first preselected position positioning the work piece relative to the viewing means until the work piece is in a selected position relative to the optical viewing;

moving the platform to the second preselected position in which the laser means is positioned is the same position as the optical means was in the first position of the platform so that a specific position of the work piece is positioned to receive laser energy; and applying laser energy to modify the work piece in a predetermined manner.

16. The method of claim 15 in which after applying the laser energy the platform is returned to the first position and the work piece examined by the optical viewing means, whereby it may be determined whether the work piece has been modified as intended.

17. The method of claim 16 in which after determining insufficient modification has occurred, the platform is repositioned to the second position and a calculated amount of further laser energy is applied to the work piece.

* * * * *